Nov. 5, 1935.　　　C. C. JONES　　　2,019,819
AIRFOIL
Filed Oct. 5, 1933　　　2 Sheets-Sheet 2
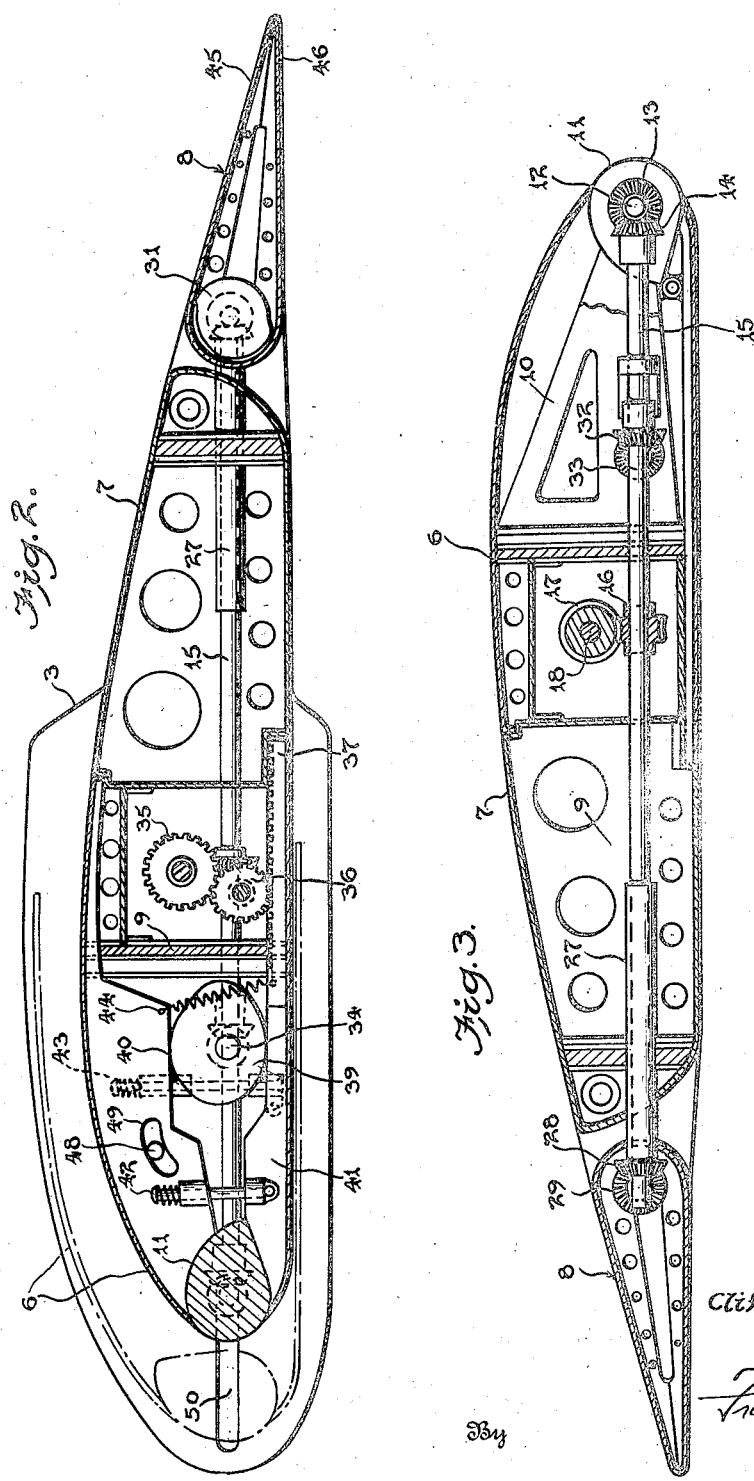

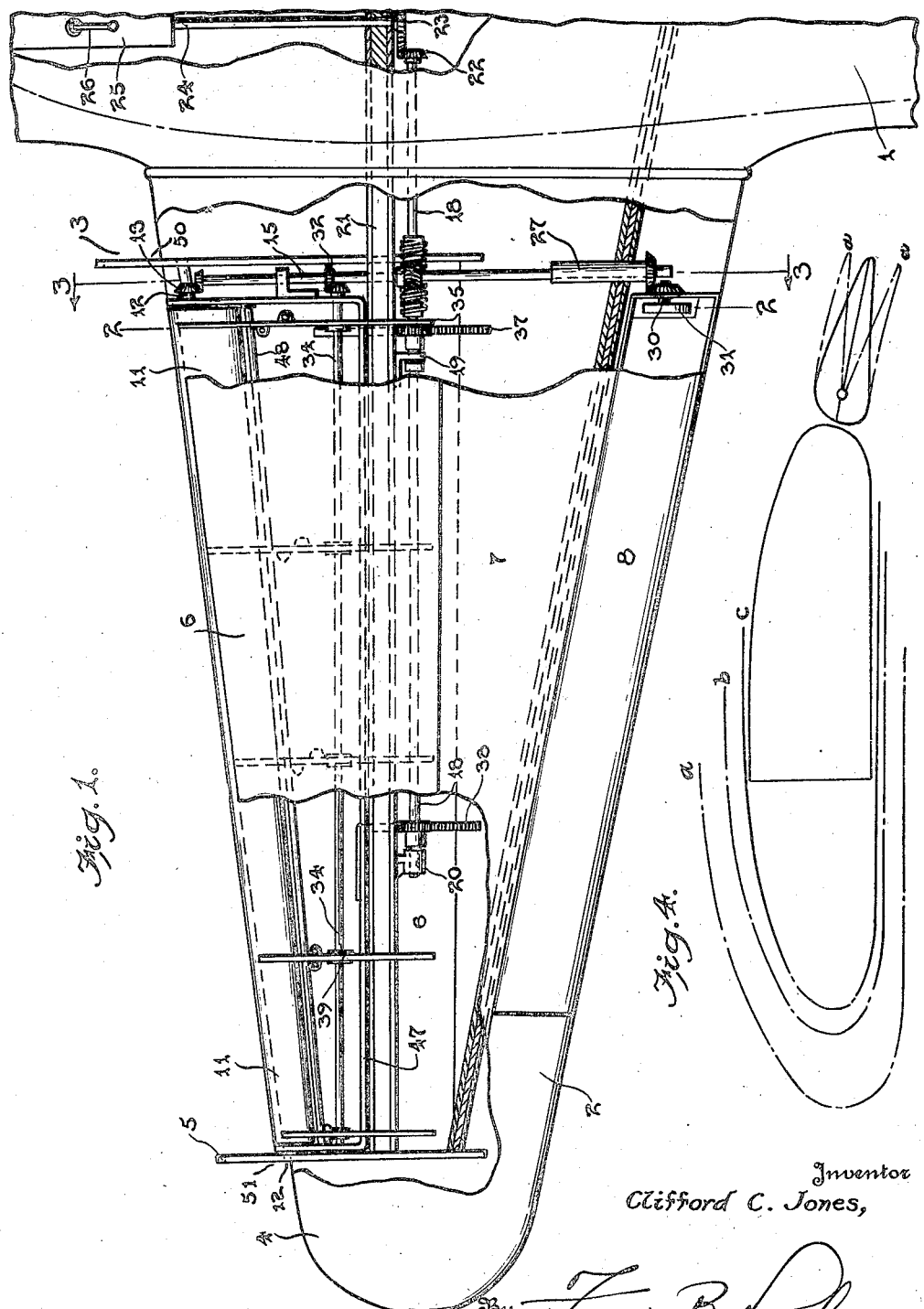

Patented Nov. 5, 1935

2,019,819

UNITED STATES PATENT OFFICE 2,019,819

AIRFOIL

Clifford C. Jones, Washington, D. C.

Application October 5, 1933, Serial No. 692,335

11 Claims. (Cl. 244—12)

This invention relates to an airfoil for heavier than air aircraft.

The fundamental of the present invention is to construct an airfoil possessing inherent synchronous characteristics and, specifically, one having an expansible and extensible chord section. Provision is also made for increasing the maximum ordinate of the section.

It is well recognized in the science of aerodynamics that it would be desirable for heavier than air craft to be provided with a different sized and contoured airfoil for high speed, for cruising, and for landing. Generally speaking, high speed flying requires a much smaller and narrower airfoil than is necessary for slow safe landing speeds. Cruising speeds are most efficient with an airfoil size approximately half way between these.

A still further object of the invention is to produce an airfoil whereby the extensible and expansible action of the forward section of the foil not only increases the magnitude of the maximum lift coefficient, which is produced by the enlarged symmetrical action, but also maintains throughout the change a perfect aerodynamical balance.

The present invention is fundamentally directed to varying the chord and the sectional ordinates of an airfoil synchronously so that when the airfoil is used in landing, cruising, or high speed flying, its exterior contour varies but will always be aerodynamically balanced.

An object of the invention is to construct an airfoil for heavier than air craft possessing means for increasing the area and depth of the airfoil section in a symmetrically expanding manner so as to produce an increased maximum lift coefficient, mean lift coefficient, and a minimum lift coefficient above that possessed by fixed nonexpansible airfoils.

A still further object of the invention is to produce an airfoil having inherent aerodynamical lift ranges whereby a positive selection of landing, take-off, cruising and high speeds are obtainable without relying solely on the propeller thrust or horse power coefficient as is customary in conventional airplanes.

A still further object of the invention is to produce an airfoil whereby a change of chord and maximum ordinates is synchronously possible without disturbing the true symmetry of the sectional ordinates code including control of both the center of gravity as well as the center of pressure moments.

Referring to the drawings, Fig. 1 is a top plan of an airfoil partly exposed to disclose the operating mechanism.

Fig. 2 is a transverse section through the airfoil taken on line 2—2 of Fig. 1.

Fig. 3 is a transverse section taken on line 3—3 of Fig. 1, while

Fig. 4 is an exaggerated diagrammatic illustration of the contour of the airfoil in its various positions.

More specifically in the drawings, 1 denotes the usual fuselage of an airplane, while 2 denotes generally a laterally extending airfoil. The airfoil 2 is attached to the fuselage 1 in any approved manner, and slightly spaced from the point of junction is provided with an upstanding fin member 3 which follows the contour of the airfoil, although it is of somewhat greater dimension. The outer tip 4 of the airfoil may be warped or otherwise operated for use as an aileron. Positioned somewhat from the end of the wing tip 4 is a second upstanding fin member 5 similar to fin 3.

The portion of the airfoil lying between the fins 3 and 5 comprises the major part of this invention and Figs. 2 and 3 are sectional views taken in this portion.

Referring to Figs. 2 and 3 of the drawings, it will be seen that the airfoil 2 comprises hollow telescoping metallic sections 6 and 7 together with a trailing edge section 8. These sections are supported by longitudinal and transverse wing spars 9 and 10, there being a sufficiency of these spars to provide the necessary strength to the airfoil. The leading edge of the airfoil section is in the form of an eccentric cam 11 and this leading edge is horizontally and pivotally mounted on shaft 12 which slides in slots 50 and 51 in fins 3 and 5 to prevent vibration and change of angle of incidence. A drive gear 13 splined to shaft 12 meshes with gear 14 which in turn is splined to transverse shaft 15. Midway of the transverse shaft 15 is a splined gear 16 meshing with worm 17 splined to drive shaft 18. This drive shaft 18 runs longitudinally of the wing or airfoil and is supported in bearing brackets 19 and 20 fastened to longitudinal spar 21. Power is applied to the shaft 18 through gears 22 and 23, the latter being affixed to a shaft 24 terminating in a change speed box 25 which receives its power from the power plant of the engine through any suitable transmission means. The change speed mechanism is operated through handle 26.

Lying between vertical fins 3 and 5 is a U-shaped horizontal brace 47 rigidly fastened to spar 21. Preferably a rod 48 is tied to the arms of the brace 47 and extends through elongated arcuate slot 48 in the upper pivoted segments 40. This rod 48 assists in strengthening the wing and keeping the segments 40 in alignment.

The rear section of shaft 15 is supported in a tubular sliding key bearing 27 which projects through the rear of section 7 of the air foil. A gear 28 is affixed to the end of the shaft and meshes with gear 29 mounted on short shaft 30 on the opposite end of which is affixed a cam member 31.

In practice, power is applied to shaft 15 through the aforementioned gear train to rotate the leading edge or cam 11 to thus enlarge the leading edge of the nose of the wing, and thus increase the normal sectional ordinates. Also it is desired to extend the width or chord of the wing in a symmetrical ratio to the expansion of the leading edge. This aerodynamic enlargement of the airfoil is accomplished by mounting a gear 35 on the drive shaft 18 which in turn meshes with reversing and reduction pinion 36 meshing with rack 37 permanently affixed to the front telescoping section 6 of the airfoil. A second rack 38 similarly operated is mounted near the outer end of shaft 18 to ensure simultaneous movement of the entire leading edge.

Intermediate the leading edge cam 11 and drive shaft 18 is a longitudinal shaft 34 receiving power through gearing 32 and 33 from shaft 15. Equispaced throughout the length of shaft 34 are a plurality of cams 39 (see Fig. 2). These cams 39 contact with pivoted segments 40 and 41 lying in the forward portion of the front section 6 of the airfoil. Consequently, when the cams 39 are rotated, the segments 40 and 41 are projected outwardly, segment 40 receiving more movement than segment 41 on account of the shape of the cams.

To ensure constant contact with the cams, the segments are provided with tension bolts 42 and 43 on opposite sides and a tension spring 44 may be also attached to the segments so that at all times the segments will rest on the cams.

As previously described, the shaft 15 extends rearwardly to rear section 8 through tubular sliding key bearing 27 to impart rotation to gearing 28 and 29 and to cam 31. This trailing edge portion 8 of the airfoil is transversely split into upper and lower sections 45 and 46 so that upon rotation of the cam 31 the section 8 divides on shaft 30 to operate to spread the sections. The movement given the segments 45 and 46 is synchronized with the expansion of section 6 so that an aerodynamic balance and aspect ratio are always maintained.

It will be readily appreciated that in the mechanical operation of the present invention, when power is applied to shaft 18 worm gearing 17 rotates shaft 15 which in turn turns the leading cam edge 11 to the position shown in dotted lines in Fig. 2. Simultaneously, gearing 35 and 36 projects the telescoping section 6 of the airfoil and being synchronous with cam 11 expands the same, particularly the upper camber. Shaft 15 being keyed in bearing 27 is permitted a considerable forward travel. Power is also given cams 39 to further expand section 6 and the dotted line position of Fig. 2 illustrates the increased maximum ordinates. The divided trailing edge section 8 also receives movement simultaneously with the expansion and extension of section 6 to open the sections 45 and 46 of the trailing edge.

Referring to Fig. 4, "a" represents the airfoil in its maximum extended position for use in landing and take-off; "b" represents the airfoil in position for cruising speeds, while "c" represents the airfoil in position for high speed flight. It will be noticed that the trailing edge is synchronous with the main portion of the airfoil and travels from a completely closed position for high speed to wide open position for low speed.

In flight it is essential to control not only the C/P travel along the chord of the airfoil but also any redistribution of the mass loads, including dynamic impact pressures and the travel or change of the C/G of the airfoil section itself. This necessary control is secured by the synchronous expansion or movement of the split trailing edge in conjunction with the expansion and extension of the forward portion of the airfoil.

To insure the normal aerodynamic stability of the mass weight of the airfoil in all positions and to decentralize the torsion and stress loads built up in the wing, the trailing edge is expanded. As a practical example, if we take a ship weighing 2785 pounds, in which the wing weighs 410 pounds, the mass forward of the C/G totals 205 pounds. This is on the assumption that the C/G of the wing has been set at its 29% ordinate of chord. After forward movement of 30 inches to increase the area of the wing 36%, the C/G moves forward with the mass but at a slower rate.

The upper flap of the edge must move 1° for every three inches of forward travel, so as to be reflexed. This maintains the distribution of weight and pressure and a complete aerodynamic balance accompanied by a small movement of the C/G travel. Without this reflex it would be 14%.

The C/P of the present airfoil moves back toward the trailing edge and increases to an unstable point the gap between the C/P and the C/G of the airfoil. The abnormal travel is arrested by moving the lower flap in synchronism with the upper flap 2½° for each three inches of forward travel.

The salient object of the present invention is to prevent the C/P and C/G coming to rest or being superimposed at the same point on the chord, and also to prevent the C/P and C/G having an abnormal path of travel from their normal positions; it being known that, in the design of the normal airfoil in flight, the C/P of the longitudinal mass and the C/G of the lateral mass coincide. Applicant considers this effect and keeps them parallel at all times. He also uses the impact pressure but always balances the mass of the airfoil in all positions.

What I claim is:

1. An airfoil, a leading edge section therefor, and means for aerodynamically and symmetrically increasing the chord and ordinates of said leading edge section.

2. An airfoil section, a leading edge portion for said airfoil section having a given chord and ordinates and means to symmetrically increase the said chord and ordinates of said leading edge portion well back of the maximum ordinate or point of maximum thickness of the wing.

3. In an airfoil section having a given minimum size and contour, means to increase the area while maintaining the aerodynamic character constant, which comprises an extensible and expansible leading edge portion, said means including a rotatable cam defining the contour of the entering edge of said leading edge portion.

4. An airfoil section with a given normal chord and ordinates and having a leading edge portion, means interiorly of the airfoil adapted to symmetrically increase the said chord and ordinates of the said leading edge portion.

5. In an airfoil section having a given minimum chord and ordinates, a leading profile section therefor having telescoping connection with the rear portion of said section and means for expanding and extending said leading edge portion in true symmetry, while increasing the lift magnitude of the lift coefficient of said section.

6. An air foil for heavier than air craft including a wing, means for varying the chord of said wing while maintaining the ratio of the leading edge radius to the chord including a rotatable cam spar whose surface forms the leading edge of the wing.

7. In an airfoil of the character described having a leading edge portion, means for symmetrically increasing the chord and maximum ordinate of said airfoil and means preventing communication of the upper and lower flow of air over said airfoil during its period of expansion and extension.

8. In an airfoil having a given minimum chord and ordinates, means to symmetrically increase the chord and ordinates of the forward portion of the airfoil, whereby the locations of the center of pressure and the center of gravity are changed with respect to each other, and means to vary the contour of the trailing portion of said airfoil simultaneously with the expansion of the forward portion to compensate for the change in relation between the $$\frac{c}{t} \text{ and } \frac{c}{p}.$$

9. In an airfoil having a given minimum chord and ordinates, means to symmetrically increase the chord and ordinates of the forward portion of the airfoil, whereby the locations of the center of pressure and the center of gravity are changed with respect to each other, and flap means to vary the contour of the trailing portion of said airfoil simultaneously with the expansion of the forward portion to compensate for the change in relation between the $$\frac{c}{t} \text{ and } \frac{c}{p}.$$

10. In an airfoil having a given minimum chord and ordinates, means to symmetrically increase the chord and ordinates of the forward portion of the airfoil, whereby the locations of the center of pressure and the center of gravity are changed with respect to each other, and split flap means to vary the contour of the trailing portion of said airfoil simultaneously with the expansion of the forward portion to compensate for the change in relation between the $$\frac{c}{t} \text{ and } \frac{c}{p}.$$

11. In an airfoil having a given minimum chord and ordinates, means to symmetrically increase the chord and ordinates of the forward portion of the airfoil, whereby the locations of the center of pressure and the center of gravity are changed with respect to each other, and means to vary the contour of the trailing portion of said airfoil simultaneously with the expansion of the forward portion to compensate for the change in relation between the $$\frac{c}{t} \text{ and } \frac{c}{p},$$

and common means to operate said first named means and said second named means.

CLIFFORD C. JONES.

Patent No. 2,019,819                        Granted November 5, 1935

CLIFFORD C. JONES

The above entitled patent was extended October 2, 1951, under the provisions of the Act of June 30, 1950, for 6 years and 91 days from the expiration of the original term thereof.

*Commissioner of Patents.*